(12) United States Patent
Tomita et al.

(10) Patent No.: US 10,181,606 B2
(45) Date of Patent: Jan. 15, 2019

(54) FUEL CELL SYSTEM AND METHOD OF CONTROLLING FUEL CELL SYSTEM

(71) Applicant: NISSAN MOTOR CO., LTD., Yokohama-shi, Kanagawa (JP)

(72) Inventors: Yosuke Tomita, Yokohama (JP); Hayato Chikugo, Yokohama (JP); Masashi Sato, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/778,917

(22) PCT Filed: Feb. 12, 2014

(86) PCT No.: PCT/JP2014/053225
§ 371 (c)(1),
(2) Date: Sep. 21, 2015

(87) PCT Pub. No.: WO2014/148153
PCT Pub. Date: Sep. 25, 2014

(65) Prior Publication Data
US 2016/0049672 A1 Feb. 18, 2016

(30) Foreign Application Priority Data

Mar. 22, 2013 (JP) ................................. 2013-059819

(51) Int. Cl.
*H01M 8/00* (2016.01)
*H01M 8/04089* (2016.01)
(Continued)

(52) U.S. Cl.
CPC ..... *H01M 8/04104* (2013.01); *H01M 8/0488* (2013.01); *H01M 8/0491* (2013.01);
(Continued)

(58) Field of Classification Search
CPC ......... H01M 8/04373; H01M 8/04738; H01M 8/04753; H01M 8/04104; H01M 8/04619;
(Continued)

(56) References Cited

U.S. PATENT DOCUMENTS

| 2004/0161643 A1* | 8/2004 | Uehara | H01M 8/04089 |
| | | | 429/443 |
| 2004/0247963 A1* | 12/2004 | Akiyama | H01M 4/926 |
| | | | 429/414 |

(Continued)

FOREIGN PATENT DOCUMENTS

| CA | 2450595 A1 | 5/2004 |
| JP | 2004-165087 A | 6/2004 |

(Continued)

*Primary Examiner* — Nicholas P D'Aniello
(74) *Attorney, Agent, or Firm* — Foley & Lardner LLP (57) ABSTRACT

A fuel cell system includes a compressor configured to adjust a flow rate of cathode gas to be supplied to a fuel cell and a pressure regulating valve configured to adjust a pressure of the supplied cathode gas. The fuel cell system further includes a controller programmed to calculate a target pressure of the supplied cathode gas while taking into consideration a load of the fuel cell and a heat protecting requirement of the fuel cell system, calculate a target flow rate of the supplied cathode gas in accordance with the load of the fuel cell and the target pressure of the cathode gas, and control the compressor and the pressure regulating valve in accordance with the target pressure and the target flow rate. The controller is further programmed to increase the target flow rate of the cathode gas as the target pressure of the cathode gas becomes lower.

10 Claims, 6 Drawing Sheets

(51) Int. Cl.

| | | |
|---|---|---|
| *H01M 8/0432* | (2016.01) | |
| *H01M 8/0438* | (2016.01) | |
| *H01M 8/04701* | (2016.01) | |
| *H01M 8/04746* | (2016.01) | |
| *H01M 8/04537* | (2016.01) | |
| *H01M 8/04858* | (2016.01) | |
| *H01M 8/04791* | (2016.01) | |

(52) U.S. Cl.
CPC ... *H01M 8/04373* (2013.01); *H01M 8/04395* (2013.01); *H01M 8/04619* (2013.01); *H01M 8/04738* (2013.01); *H01M 8/04753* (2013.01); *H01M 8/04798* (2013.01); *H01M 8/0432* (2013.01); *H01M 8/0438* (2013.01); *H01M 8/04358* (2013.01); *H01M 8/04559* (2013.01); *H01M 8/04589* (2013.01); *H01M 2250/20* (2013.01); *Y02T 90/32* (2013.01)

(58) Field of Classification Search
CPC ............. H01M 8/0488; H01M 8/0491; H01M 8/04798; H01M 8/04395; H01M 8/0438; H01M 8/0432; H01M 8/04358; H01M 8/04559; H01M 8/04589; H01M 8/04; H01M 2250/20; Y02T 90/32
See application file for complete search history.

(56) References Cited

U.S. PATENT DOCUMENTS

2006/0280976 A1\* 12/2006 Hashigaya .......... H01M 8/0267
429/413
2013/0089801 A1    4/2013 Takeshita et al.

FOREIGN PATENT DOCUMENTS

| JP | 2005-71939 A | 3/2005 |
| JP | 2006-147284 A | 6/2006 |
| JP | 2009-224313 A | 10/2009 |
| JP | 2012-3957 A | 1/2012 |

\* cited by examiner

FUEL CELL SYSTEM AND METHOD OF CONTROLLING FUEL CELL SYSTEM

TECHNICAL FIELD

The present invention relates to a fuel cell system.

BACKGROUND ART

In JP2012-003957A, as a conventional the fuel cell system, one in which a flow rate of a cathode gas is controlled by a compressor provided on a cathode gas supply passage and a pressure of the cathode gas is controlled by a pressure regulating valve provided on a cathode gas discharge passage is described.

SUMMARY OF THE INVENTION

A pressure and a flow rate of a cathode gas are normally controlled to respective target values separately calculated in accordance with a target output current so that an oxygen partial pressure within a fuel cell stack falls below a predetermined oxygen partial pressure even though the target output current is taken out from the fuel cell stack.

However, in order to protect the fuel cell system from heat, there is a case where a pressure of the cathode gas has to be lowered temporarily to lower temperature downstream from the compressor. In that case, it was found that the following problems occur when a pressure and a flow rate of the cathode gas are respectively controlled to target values calculated in accordance with the target output current separately as described above.

Namely, even though the pressure of the cathode gas is controlled to a target value smaller than the target value calculated in accordance with the target output current in order to protect the fuel cell system from heat, the flow rate of the cathode gas is controlled to the target value calculated in accordance with the target output current. For that reason, there is a fear that an oxygen partial pressure within the fuel cell stack falls below a predetermined oxygen partial pressure.

The present invention has been made in view of such a problem, and it is an object of the present invention to suppress an oxygen partial pressure in a fuel cell stack from falling below a predetermined oxygen partial pressure.

According to an aspect of the present invention, there is provided a fuel cell system configured to generate an electric power by supplying an anode gas and a cathode gas to a fuel cell. The fuel cell system includes: a compressor configured to adjust a flow rate of the cathode gas to be supplied to the fuel cell; a pressure regulating valve configured to adjust a pressure of the cathode gas to be supplied to the fuel cell; a target pressure calculating unit configured to calculate a target pressure of the cathode gas to be supplied to the fuel cell while taking into consideration a load of the fuel cell and a heat protecting requirement of the fuel cell system; a target flow rate calculating unit configured to calculate a target flow rate of the cathode gas to be supplied to the fuel cell in accordance with the load of the fuel cell and the target pressure of the cathode gas; and a control unit configured to control the compressor and the pressure regulating valve in accordance with the target pressure and the target flow rate of the cathode gas.

DESCRIPTION OF THE EMBODIMENTS

Hereinafter, each of embodiments of the present invention will be described with reference to the accompanying drawings and the like.

First Embodiment

In a fuel cell, an electrolyte membrane is sandwiched between an anode electrode (fuel electrode) and a cathode electrode (oxidant electrode), and electric power is generated by supplying an anode gas (fuel gas) containing hydrogen to the anode electrode and supplying a cathode gas (oxidant gas) containing oxygen to the cathode electrode. Electrode reactions that proceed on both the anode electrode and the cathode electrode are as follows.

$$\text{Anode Electrode: } 2H_2 \rightarrow 4H^+ + 4e^- \quad (1)$$

$$\text{Cathode Electrode: } 4H^+ + 4e^- + O_2 \rightarrow 2H_2O \quad (2)$$

The fuel cell generates an electromotive force of about one volt by means of these electrode reactions (1) and (2).

In a case where a fuel cell is utilized as a power source for a vehicle, the electric power to be required becomes greater. For this reason, the fuel cells are used as a fuel cell stack in which several hundreds of the fuel cells are laminated. Then, by constituting a fuel cell system for supplying the anode gas and the cathode gas to the fuel cell stack, an electric power for driving the vehicle is taken out.

Figure 1:
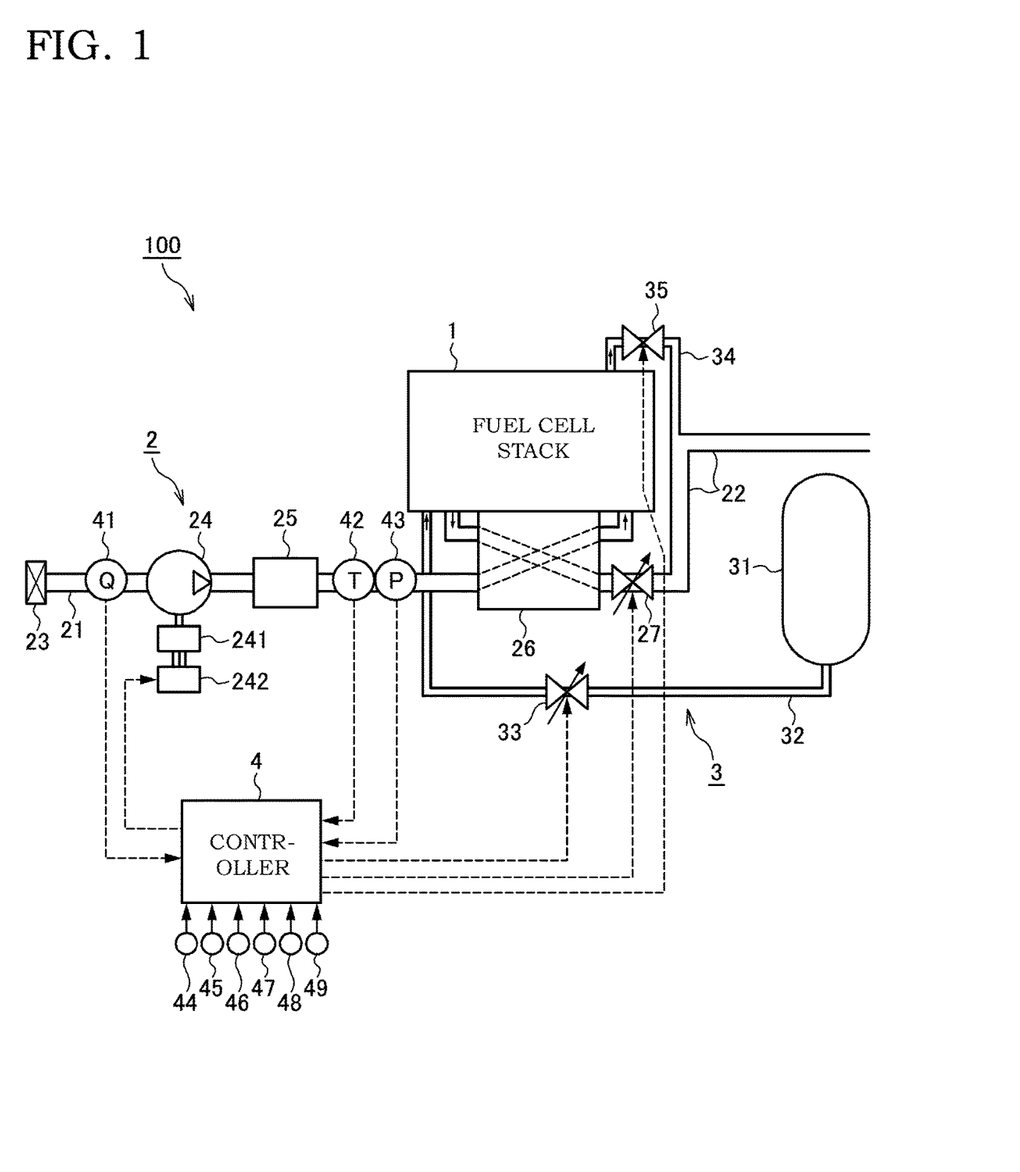
FIG. 1 is a schematic view of a fuel cell system according to a first embodiment of the present invention.

FIG. 1 is a schematic view of a fuel cell system 100 according to a first embodiment of the present invention.

The fuel cell system 100 includes a fuel cell stack 1, a cathode gas supply/discharge device 2, an anode gas supply/discharge device 3, and a controller 4.

The fuel cell stack 1 is constructed by stacking several hundreds of fuel cells, and receives the supply of the anode gas and the cathode gas to generate an electric power necessary for driving of the vehicle.

The cathode gas supply/discharge device 2 supplies the cathode gas to the fuel cell stack 1, and discharges a cathode off-gas discharged from the fuel cell stack 1 to the outside air. The cathode gas supply/discharge device 2 includes a cathode gas supply passage 21, a cathode gas discharge passage 22, a filter 23, a cathode compressor 24, an intercooler 25, a water recovery device (Water Recovery Device: hereinafter, referred to as a "WRD") 26, a cathode pressure regulating valve 27, an air flow sensor 41, a temperature sensor 42, and a pressure sensor 43.

The cathode gas supply passage 21 is a passage in which the cathode gas to be supplied to the fuel cell stack 1 flows. One end of the cathode gas supply passage 21 is connected to the filter 23, and the other end thereof is connected to a cathode gas inlet hole of the fuel cell stack 1.

The cathode gas discharge passage 22 is a passage in which the cathode off-gas discharged from the fuel cell stack 1 flows. One end of the cathode gas discharge passage 22 is connected to a cathode gas outlet hole of the fuel cell stack 1, and the other end thereof becomes an opening end. The cathode off-gas is a mixture gas of the cathode gas and steam generated by an electrode reaction.

The filter 23 removes foreign matter in the cathode gas to be taken in the cathode gas supply passage 21.

The cathode compressor 24 is provided on the cathode gas supply passage 21. The cathode compressor 24 takes air (outside air) in the cathode gas supply passage 21 as the cathode gas via the filter 23, and supplies the air to the fuel cell stack 1. The cathode compressor 24 is driven by a compressor drive motor 241. A compressor drive inverter 242 that converts a DC electric power supplied from the fuel cell stack 1 into an AC electric power is connected to the compressor drive motor 241. By controlling the compressor drive inverter 242 by means of a controller, not only the compressor drive motor 241 but also the cathode compressor 24 are controlled.

The intercooler 25 is provided on the cathode gas supply passage 21 downstream from the cathode compressor 24. The intercooler 25 cools the cathode gas discharged from the cathode compressor 24.

The WRD 26 is connected to each of the cathode gas supply passage 21 and the cathode gas discharge passage 22 to collect moisture in the cathode off-gas flowing in the cathode gas discharge passage 22. The WRD 26 humidifies the cathode gas flowing in the cathode gas supply passage 21 using the collected moisture.

The cathode pressure regulating valve 27 is provided on the cathode gas discharge passage 22 downstream from the WRD 26. Opening and closing of the cathode regulating valve 27 is controlled by the controller 4 to adjust a pressure of the cathode gas to be supplied to the fuel cell stack 1 at a desired pressure.

The air flow sensor 41 is provided on the cathode gas supply passage 21 upstream from the cathode compressor 24. The air flow sensor 41 detects a flow rate of the cathode gas supplied to the cathode compressor 24 and finally supplied to the fuel cell stack 1 (hereinafter, referred to as a "stack supply flow rate").

The temperature sensor 42 is provided on the cathode gas supply passage 21 between the intercooler 25 and the WRD 26. The temperature sensor 42 detects temperature at an inlet side of the WRD 26 for the cathode gas (hereinafter, referred to as "WRD inlet temperature").

The pressure sensor 43 is provided on the cathode gas supply passage 21 between the intercooler 25 and the WRD 26. The pressure sensor 43 detects a pressure at the inlet side of the WRD 26 for the cathode gas (hereinafter, referred to as a "WRD inlet pressure").

The anode gas supply/discharge device 3 supplies the anode gas to the fuel cell stack 1, and discharges an anode off-gas discharged from the fuel cell stack 1 to the cathode gas discharge passage 22. The anode gas supply/discharge device 3 includes a high-pressure tank 31, an anode gas supply passage 32, an anode pressure regulating valve 33, an anode gas discharge passage 34, and a purge valve 35.

The high-pressure tank 31 keeps and stores the anode gas to be supplied to the fuel cell stack 1 in a high-pressure state.

The anode gas supply passage 32 is a passage to supply the anode gas discharged from the high-pressure tank 31 to the fuel cell stack 1. One end of the anode gas supply passage 32 is connected to the high-pressure tank 31, and the other end thereof is connected to an anode gas inlet hole of the fuel cell stack 1.

The anode pressure regulating valve 33 is provided on the anode gas supply passage 32. Opening and closing of the anode pressure regulating valve 33 is controlled by the controller 4 to adjust a pressure of the anode gas supplied to the fuel cell stack 1 at a desired pressure.

The anode gas discharge passage 34 is a passage in which the anode off-gas discharged from the fuel cell stack 1 flows. One end of the anode gas discharge passage 34 is connected to an anode gas outlet hole of the fuel cell stack 1, the other end thereof is connected to the cathode gas discharge passage 22.

The anode off-gas discharged to the cathode gas discharge passage 22 via the anode gas discharge passage 34 is mixed with the cathode off-gas in the cathode gas discharge passage 22, and is discharged to the outside of the fuel cell system 100. An excessive anode gas (hydrogen) that has not been used for the electrode reaction is contained in the anode off-gas. For this reason, by mixing the anode off-gas with the cathode off-gas and then discharging the mixture gas to the outside of the fuel cell system 100, hydrogen concentration in the discharged gas is set so as to become predetermined concentration that is defined in advance or lower.

The purge valve 35 is provided on the anode gas discharge passage 34. Opening and closing of the purge valve 35 is controlled by the controller 4 to control a flow rate of the anode off-gas discharged from the anode gas discharge passage 34 to the cathode gas discharge passage 22.

The controller 4 is configured by a microcomputer that includes a Central Processing Unit (CPU), a Read Only Memory (ROM), a Random Access Memory (RAM) and an input/output interface (I/O interface). In addition to the air flow sensor 41, the temperature sensor 42 and the pressure sensor 43 described above, signals from various kinds of sensors are inputted to the controller 4. The various kinds of sensors includes: a current sensor 44 for detecting a current taken out from the fuel cell stack 1 (an output current); a voltage sensor 45 for detecting an output voltage of the fuel cell stack 1; a water temperature sensor 46 for detecting temperature of a cooling water that cools the fuel cell stack 1 (hereinafter, referred to as "cooling water temperature"); a rotational speed sensor 47 for detecting a rotational speed of the cathode compressor 24; an atmospheric pressure sensor 48 for detecting an atmospheric pressure; an outside air temperature sensor 49 for detecting outside air temperature; and the like.

The controller 4 calculates a target value of the current taken out from the fuel cell stack 1 (hereinafter, referred to as a "target output current") on the basis of the detected signals of the various kinds of sensors.

The controller 4 then controls a WRD inlet pressure and the stack supply flow rate to suitable target values so that an oxygen partial pressure within the fuel cell stack 1 falls below a predetermined oxygen partial pressure even though the target output current is taken out from the fuel cell stack 1. This is because, when the oxygen partial pressure becomes lower than the predetermined oxygen partial pressure, there is a shortage of oxygen required for power generation, and this causes IV characteristics (current/voltage characteristics) of the fuel cell stack 1 to be lowered. There is a fear that, when the target output current is taken out from the fuel cell stack 1, the output voltage of the fuel cell stack 1 may fall below the minimum output voltage required for driving a drive motor and the like for the vehicle.

Here, as described above, as a method of controlling the WRD inlet pressure and the stack supply flow rate to the suitable target values, there is a method in which the WRD inlet pressure and the stack supply flow rate so that the oxygen partial pressure within the fuel cell stack 1 does not fall below the predetermined oxygen partial pressure are obtained in advance for each output current of the fuel cell stack 1 by means of experimentation or the like, and the target values of the WRD inlet pressure and the stack supply flow rate are calculated separately on the basis of the target output current by referring to a map created on the basis of the experimentation or the like.

However, it was found that the following problems occur in a case where the target values of the WRD inlet pressure and the stack supply flow rate are calculated separately on the basis of the target output current in this manner.

At the time of a high load operation in which the target output current of the fuel cell stack 1 becomes relatively higher, an oxygen consumption amount becomes larger. Therefore, it is required to increase the target values of the WRD inlet pressure and the stack supply flow rate in order to ensure the oxygen partial pressure. For that reason, there is a fear that, in a case where the high load operation is continued, temperature downstream from the cathode compressor 24, that is, outlet temperature of the cathode compressor 24 and/or the WRD inlet temperature rise, and the temperature exceeds heat resistance temperature of the cathode compressor 24 or the WRD 26 in some cases.

Therefore, in order to avoid such a situation, there are cases where the WRD inlet pressure is to be lowered temporarily in accordance with an operational state of the cathode compressor 24 and the WRD inlet temperature to lower the outlet temperature of the cathode compressor 24 or the WRD inlet temperature. Namely, there are cases where the target value of the WRD inlet pressure is to temporarily become lower than the target value of the WRD inlet pressure calculated on the basis of the target output current.

In a case where the target values of the WRD inlet pressure and the stack supply flow rate are calculated separately on the basis of the target output current as described above, the stack supply flow rate is controlled to the target value of the stack supply flow rate calculated on the basis of the target output current even though the WRD inlet pressure is controlled so as to become lower than the target value of the WRD inlet pressure calculated on the basis of the target output current. For that reason, a problem that the oxygen partial pressure within the fuel cell stack 1 may fall below the predetermined oxygen partial pressure occurs.

Therefore, in the present embodiment, a target value of the stack supply flow rate for ensuring an oxygen partial pressure within the fuel cell stack 1 is compensated so as to be increased on the basis of a target value of the WRD inlet pressure. Namely, by increasing the stack supply flow rate by reduction of the WRD inlet pressure, the oxygen partial pressure is set so as not to fall below the predetermined oxygen partial pressure. Hereinafter, a control of a cathode system according to the present embodiment will be described.

Figure 2:
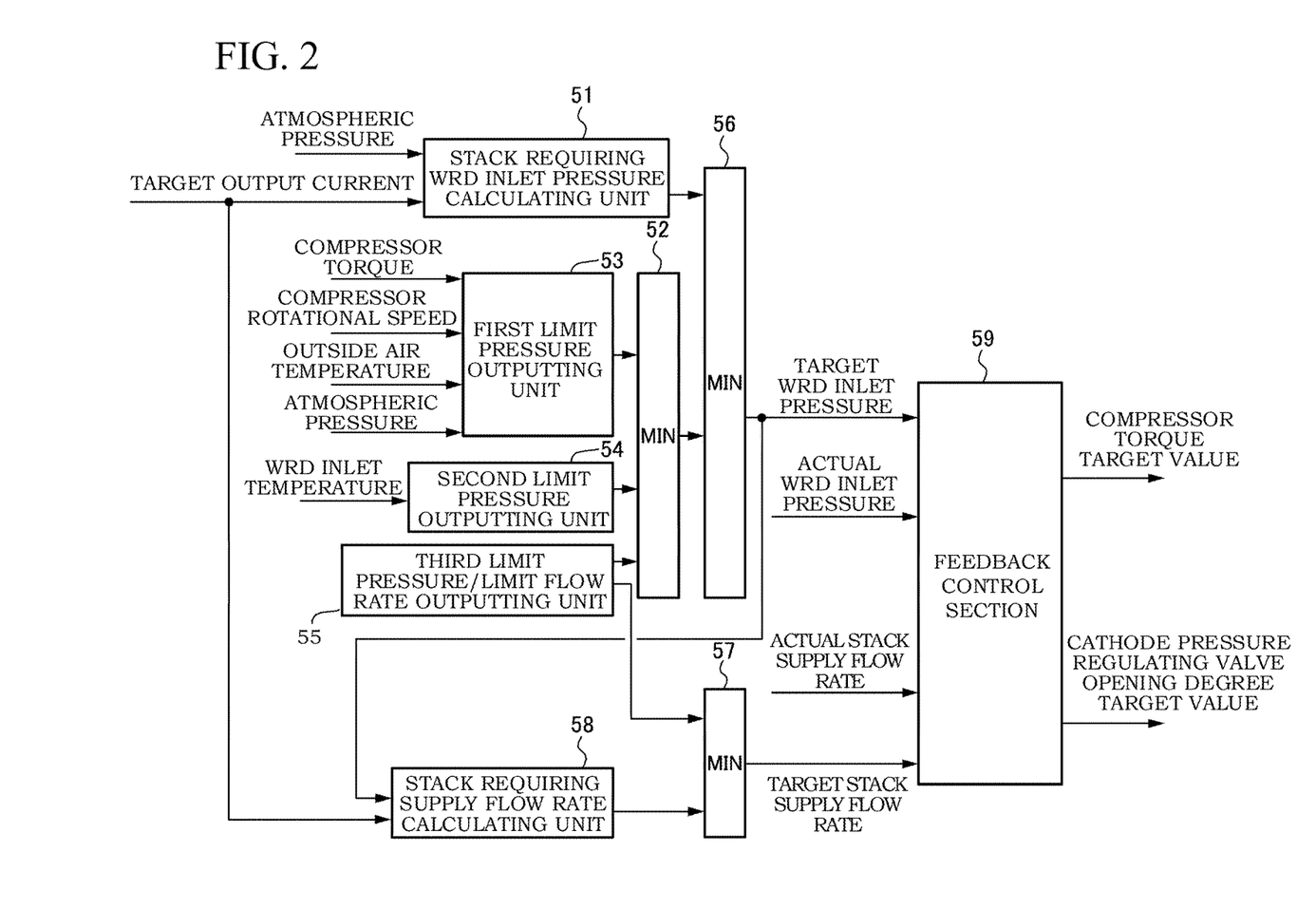
FIG. 2 is a control block diagram for explaining a control of a cathode system according to the first embodiment of the present invention.

FIG. 2 is a control block diagram for explaining a control for the cathode system according to the present embodiment.

A control block for the cathode system according to the present embodiment includes a stack requiring WRD inlet pressure calculating unit 51, a limit pressure setting unit 52, a first limit pressure outputting unit 53, a second limit pressure outputting unit 54, a third limit pressure/limit flow rate outputting unit 55, a target WRD inlet pressure setting unit 56, a target stack supply flow rate setting unit 57, a stack requiring supply flow rate calculating unit 58, and a feedback control unit 59.

Figure 3:
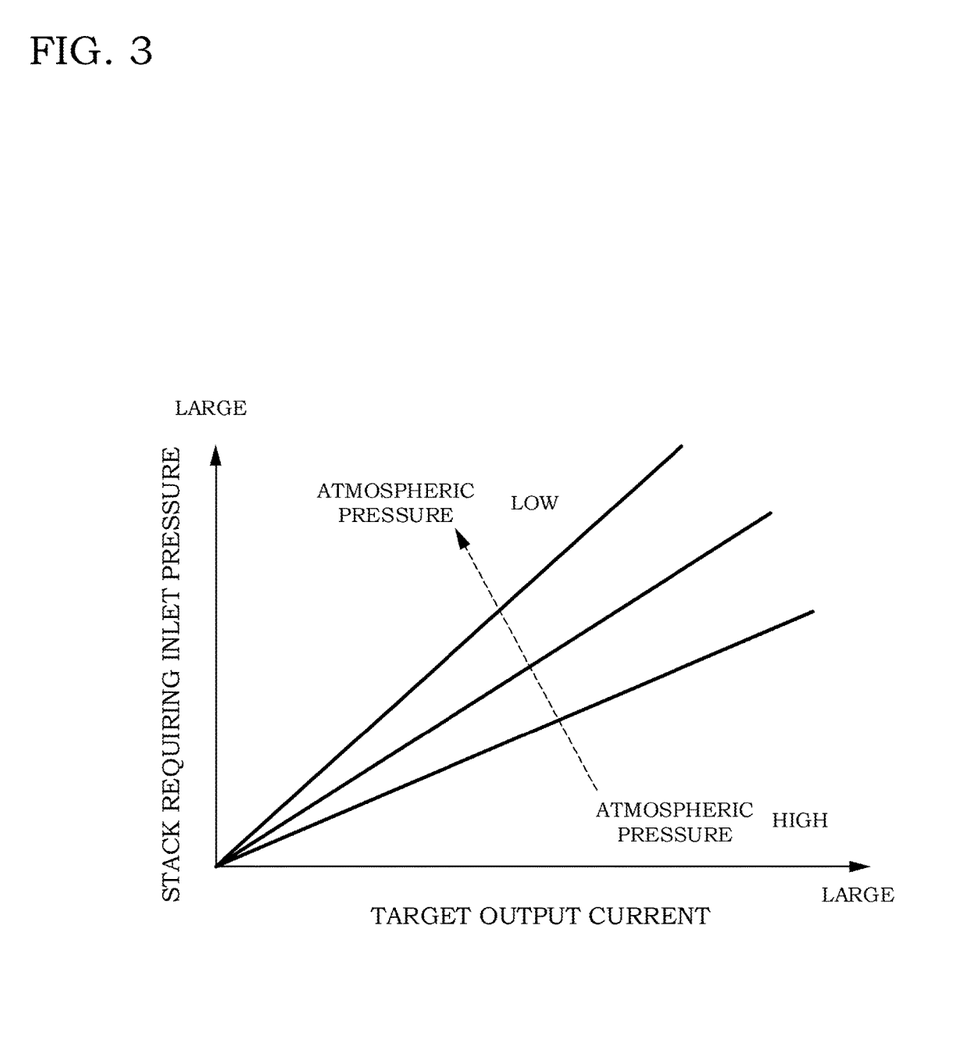
FIG. 3 is a map for calculating a stack requiring WRD inlet pressure.

The stack requiring WRD inlet pressure calculating unit 51 refers to a map shown in FIG. 3, and calculates a stack requiring WRD inlet pressure on the basis of the target output current of the fuel cell stack 1 and an atmospheric pressure. The stack requiring WRD inlet pressure is a target value of the WRD inlet pressure required to ensure the oxygen partial pressure within the fuel cell stack 1 when the target output current is taken out from the fuel cell stack 1. Thus, the stack requiring WRD inlet pressure calculating unit 51 sets up the target value of the suitable WRD inlet pressure according to a load of the fuel cell stack 1 as the stack requiring WRD inlet pressure.

The limit pressure setting unit 52 sets up an upper limit value of the WRD inlet pressure (hereinafter, referred to as a "limit pressure"), which is required in order to protect the cathode system from heat. Specifically, the limit pressure setting unit 52 sets up a target value of the WRD inlet pressure as a limit pressure. The target value of the WRD inlet pressure is required in order to satisfy heat protecting requirements for the whole fuel cell system including the cathode compressor 24, the fuel cell stack 1, the WRD 26, the compressor drive inverter 242 and the like. A first limit pressure, a second limit pressure and a third limit pressure are inputted to the limit pressure setting unit 52, and the limit pressure setting unit 52 sets up the minimum one of these as a limit pressure.

The first limit pressure outputting unit 53 outputs the first limit pressure. The first limit pressure is an upper limit value of the WRD inlet pressure for preventing the outlet temperature of the cathode compressor 24 from becoming the heat resistance temperature of the cathode compressor 24 or higher. The first limit pressure is calculated in accordance with a compressor rotational speed, a compressor torque, outside air temperature (intake air temperature) and an atmospheric pressure, for example. The higher any of the compressor rotational speed and the outside air temperature becomes basically, the lower the first limit pressure becomes. The lower the compressor torque becomes, the lower the first limit pressure becomes. In this regard, the method of calculating the first limit pressure is not limited to this method. For example, a method in which the outlet temperature of the cathode compressor 24 is detected and the first limit pressure is calculated on the basis of the outlet temperature may be adopted. Thus, the first limit pressure outputting unit 53 calculates the WRD inlet pressure so that the outlet temperature of the cathode compressor 24 does not become the heat resistance temperature of the cathode compressor 24 or higher, and outputs the calculated WRD inlet pressure as the first limit pressure.

The second limit pressure outputting unit 54 outputs the second limit pressure. The second limit pressure is an upper limit value of the WRD inlet pressure for preventing each of downstream components of the cathode compressor 24, such as the WRD 26, the fuel cell stack 1 and the like, from becoming the heat resistance temperature or higher. The second limit pressure is calculated in accordance with the WRD inlet temperature, for example. The higher the WRD inlet temperature becomes basically, the lower the second limit pressure becomes. In this regard, a method of calculating the second limit pressure is not limited to this method. For example, a method in which temperature of a specific portion downstream from the cathode compressor 24 is detected and the second limit pressure is calculated on the basis of the detected temperature may be adopted. Thus, the second limit pressure outputting unit 54 calculates the WRD inlet pressure so that the temperature downstream from the cathode compressor 24 does not become heat resistance temperature of components arranged downstream or higher, and then outputs it to the second limit pressure.

The third limit pressure/limit flow rate outputting unit 55 outputs, as the third limit pressure and a limit flow rate, the WRD inlet pressure and the stack supply flow rate for preventing temperature of the compressor drive inverter 242 from becoming the heat resistance temperature or higher. Each of the third limit pressure and the limit flow rate is a predetermined value defined in advance by means of experimentation and the like. Each of the third limit pressure and the limit flow rate is outputted in order to protect the compressor drive inverter 242 from heat when the temperature of the compressor drive inverter 242 becomes higher than predetermined temperature that is lower than the heat resistance temperature. When the temperature of the compressor drive inverter 242 becomes the predetermined temperature or higher, the third limit pressure and the limit flow rate are basically selected as the target WRD inlet pressure and a target stack supply flow rate (will be described later), and an upper limit value is also set up for the target output current so that the oxygen partial pressure within the fuel cell stack 1 can be ensured. In this regard, the temperature of the compressor drive inverter 242 may be estimated on the basis of an electric power to be supplied to the compressor drive motor 241, or may be detected directly.

The target WRD inlet pressure setting unit 56 sets up the smaller one of the stack requiring WRD inlet pressure and the limit pressure as the target WRD inlet pressure. In the target WRD inlet pressure setting unit 56, the stack requiring WRD inlet pressure is normally set up as the target WRD inlet pressure. In a case where it is necessary for the cathode system is to be protected from heat, for example, in a case where the high load operation is continued, the limit pressure is set up the target WRD inlet pressure. Thus, the target WRD inlet pressure setting unit 56 sets up the target WRD inlet pressure by taking into consideration the load of the fuel cell stack 1 and the heat protecting requirement for the fuel cell system 100.

The target stack supply flow rate setting unit 57 sets up the smaller one of a stack requiring supply flow rate calculated by the stack requiring supply flow rate calculating unit 58 (will be described later) and the limit flow rate as target stack supply flow rate. In the target stack supply flow rate setting unit 57, the stack requiring supply flow rate is basically set up as the target stack supply flow rate in the case other than when the temperature of the compressor drive inverter 242 becomes the predetermined temperature or higher. Thus, the target stack supply flow rate setting unit 57 basically sets up a target flow rate (target stack supply flow rate) of the cathode gas to be supplied to the fuel cell stack 1 in accordance with the load of the fuel cell stack 1 and a target pressure of the cathode gas (the target WRD inlet pressure).

Figure 4:
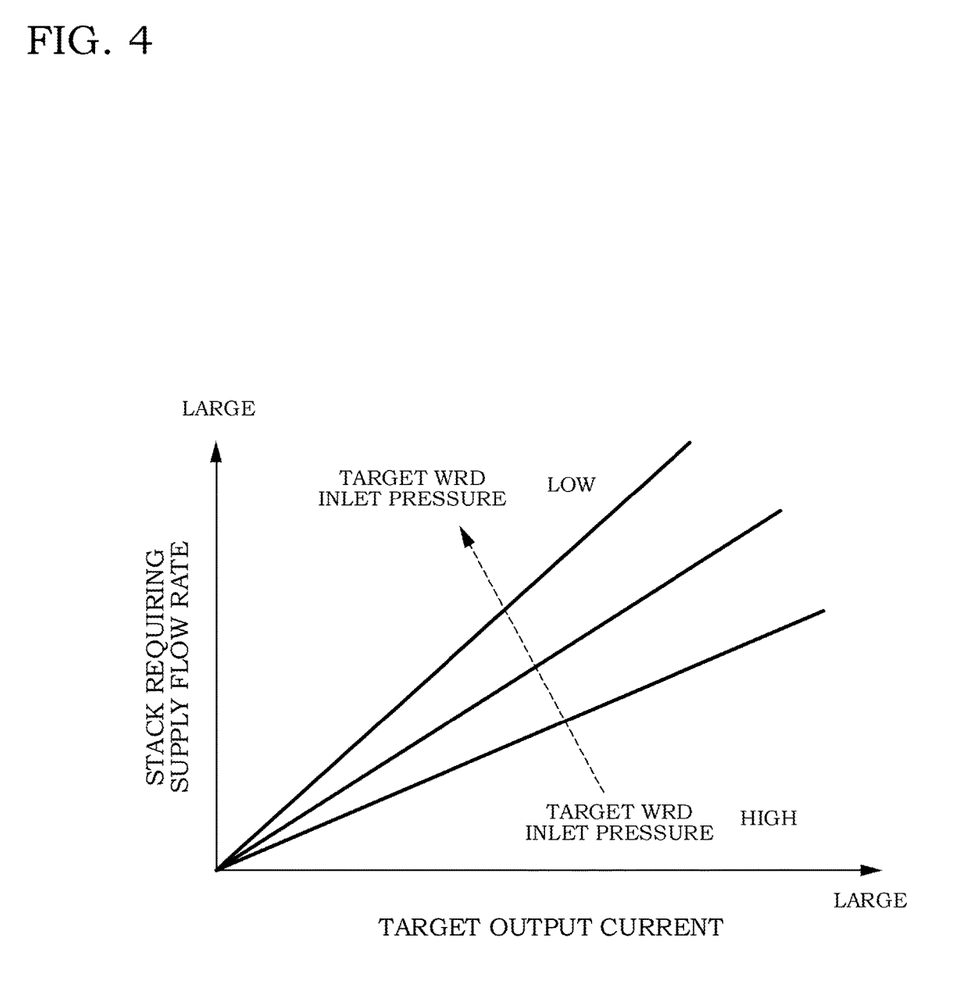
FIG. 4 is a map for calculating a stack requiring supply flow rate.

The stack requiring supply flow rate calculating unit 58 refers to a map of FIG. 4 to calculate the stack requiring supply flow rate on the basis of the target output current (the load) of the fuel cell stack 1 and the target WRD inlet pressure. As shown in the map of FIG. 4, the stack requiring supply flow rate is compensated so as to become larger as the target WRD inlet pressure is lower. Therefore, in a case where the limit pressure (the first limit pressure or the second limit pressure) is selected as the target WRD inlet pressure, it is possible to increase the target stack supply flow rate compared with a case where the stack requiring WRD inlet pressure is selected as the target WRD inlet pressure. Namely, the stack supply flow rate can be increased by the amount that the WRD inlet pressure is lowered from the stack requiring WRD inlet pressure to the limit pressure. Therefore, it is possible to suppress the oxygen partial pressure within the fuel cell stack 1 from falling below the predetermined oxygen partial pressure.

An actual WRD inlet pressure detected by the pressure sensor 43, the target WRD inlet pressure, an actual stack supply flow rate detected by the air flow sensor 41 and the target stack supply flow rate are inputted to the feedback control unit 59. The feedback control unit 59 calculates a target value of a compressor torque for converging the actual WRD inlet pressure to the target WRD inlet pressure and a target value of an opening degree of the cathode pressure regulating valve 27 for converging the actual stack supply flow rate to the target stack supply flow rate by substituting these input values into an expression in which the system is modeled.

Figure 5:
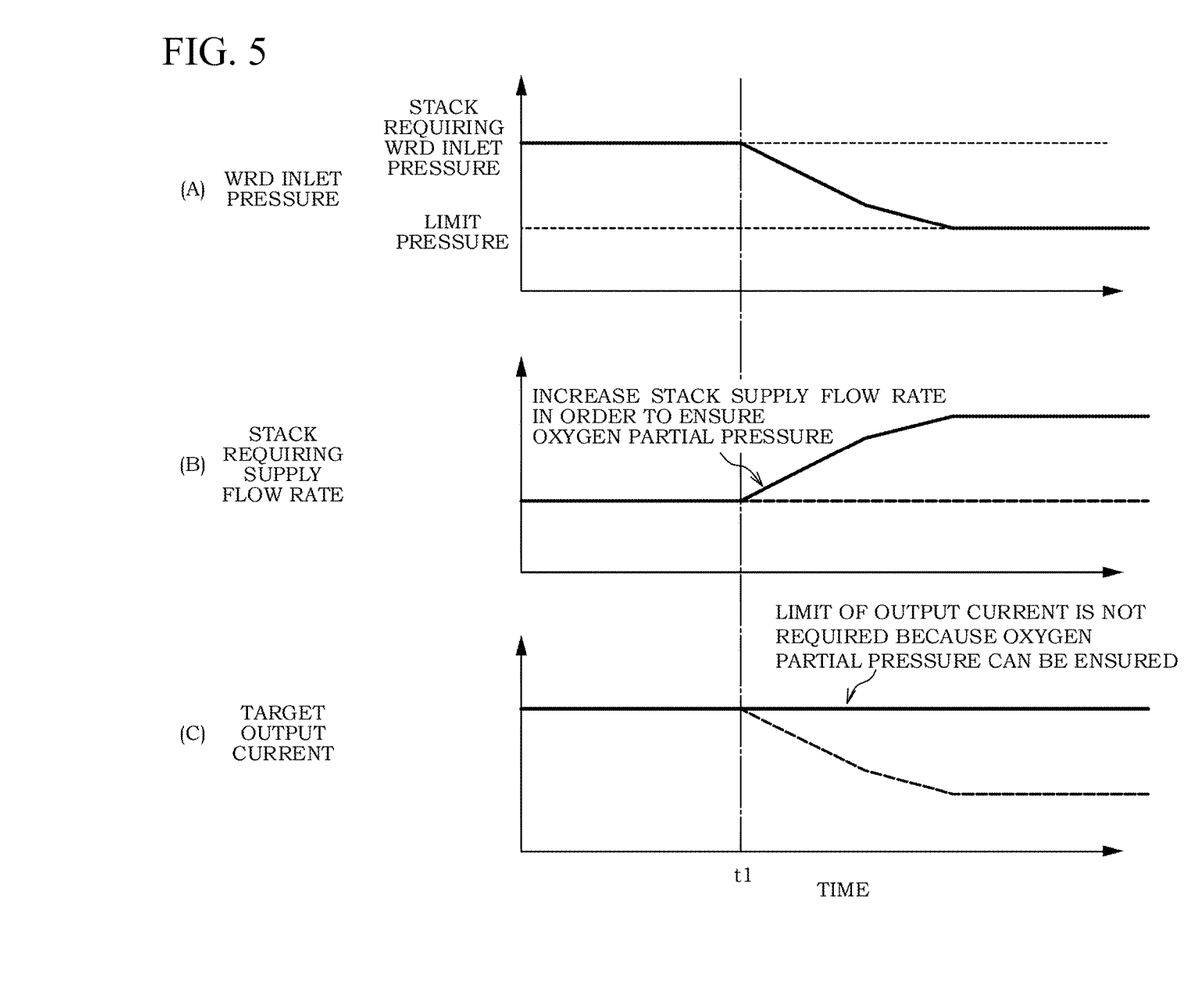
FIG. 5 is a time chart for explaining an operation of a control for the cathode system according to the first embodiment of the present invention.

FIG. 5 is a time chart for explaining an operation of a control for the cathode system according to the present embodiment.

When the target WRD inlet pressure is switched from the stack requiring WRD inlet pressure to the limit pressure (the first limit pressure or the second limit pressure) at time t1, the cathode pressure regulating valve 27 is feedback controlled so that the WRD inlet pressure is lowered toward the limit pressure (FIG. 5(A)). Then, when the target WRD inlet pressure is switched to the limit pressure, the stack requiring supply flow rate is compensated so as to be increased, thereby increasing the target stack supply flow rate. As a result, the cathode compressor 24 is feedback controlled so that the stack supply flow rate is increased toward the target stack supply flow rate (FIG. 5(B)).

Here, in a case where the stack requiring supply flow rate is not compensated so as to be increased in accordance with the target WRD inlet pressure as shown in FIG. 5(B) by a broken line and the target output current before the target WRD inlet pressure is switched to the limit pressure before the time t1 is taken out from the fuel cell stack 1, it becomes impossible to ensure the oxygen partial pressure within the fuel cell stack 1. For that reason, as shown in FIG. 5(C) by a broken line, there is a need to lower the target output current in order to ensure the oxygen partial pressure within the fuel cell stack 1. This causes an output of the vehicle to be lowered.

On the other hand, according to the present embodiment, it is possible to increase the stack supply flow rate by the amount that the WRD inlet pressure is lowered from the stack requiring WRD inlet pressure to the limit pressure. Therefore, it is possible to suppress the oxygen partial pressure within the fuel cell stack 1 from falling below the predetermined oxygen partial pressure.

The fuel cell system 100 according to the present embodiment as explained above is configured so that: the target WRD inlet pressure setting unit 56 sets up the target pressure of the cathode gas to be supplied to the fuel cell stack 1 (the target WRD inlet pressure) by taking into consideration the load of the fuel cell stack 1 and the heat protecting requirement for the fuel cell system 100; and the stack requiring supply flow rate calculating unit 58 sets up the target flow rate of the cathode gas to be supplied to the fuel cell stack 1 (the stack requiring supply flow rate) in accordance with the load of the fuel cell stack 1 and the target pressure of the cathode gas. The fuel cell system 100 according to the present embodiment is also configured so that the feedback control unit 59 then controls the cathode compressor 24 and the cathode pressure regulating valve 27 in accordance with the target pressure of the cathode gas and the target flow rate.

For that reason, even though the target pressure of the cathode gas is lowered for heat protection of the fuel cell system 100, the target flow rate of the cathode gas is calculated by taking into consideration the target pressure of the cathode gas. Therefore, the target flow rate of the cathode gas is increased as a result. For that reason, it is possible to suppress the oxygen partial pressure within the fuel cell stack 1 from falling below the predetermined oxygen partial pressure.

Second Embodiment

Next, a second embodiment according to the present invention will be described. The present embodiment is different from the first embodiment in that the stack requiring supply flow rate is further compensated in accordance with temperature within the fuel cell stack 1 and the like. Hereinafter, explanation will be made by focusing the difference. It should be noted that components serving as the similar functions in the first embodiment described above are denoted by the same reference numerals in the following embodiment, and the overlapping explanation will be omitted appropriately.

Figure 6:
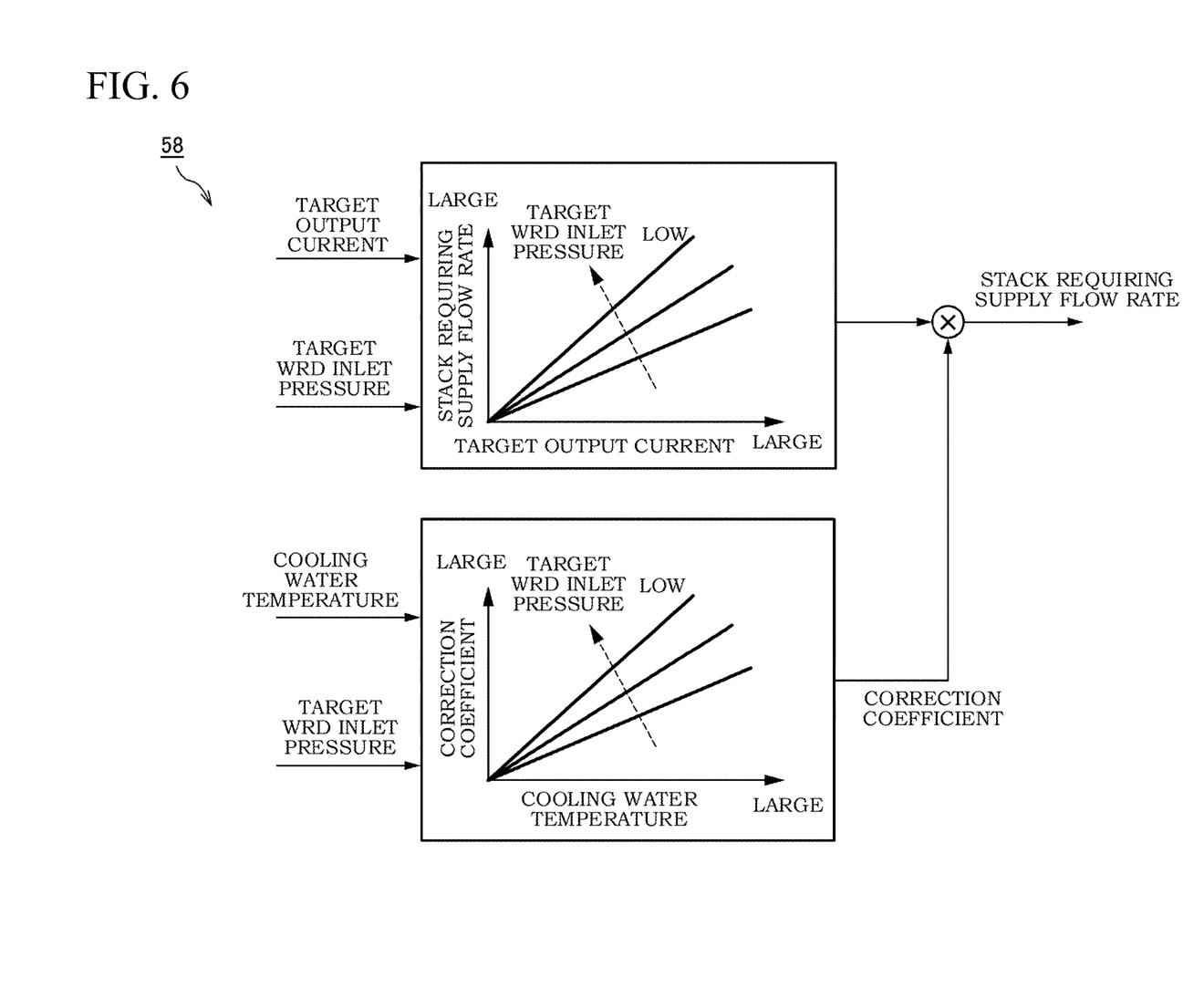
FIG. 6 is a control block diagram showing a stack requiring supply flow rate calculating unit according to a second embodiment of the present invention.

FIG. 6 is a control block diagram showing a stack requiring supply flow rate calculating unit 58 according to the present embodiment.

The higher the temperature within the fuel cell stack 1 becomes, the higher a steam partial pressure within the fuel cell stack 1 becomes. In addition, the lower the pressure within the fuel cell stack 1 becomes, the higher the steam partial pressure within the fuel cell stack 1 becomes. This causes the oxygen partial pressure to be lowered by that pressure.

For that reason, in the present embodiment, a correction coefficient is calculated on the basis of cooling water temperature and the target WRD inlet pressure, and this correction coefficient is multiplied by a stack requiring supply flow rate calculated on the basis of the target output current of the fuel cell stack 1 and the target WRD inlet pressure to compensate the stack requiring supply flow rate.

The correction coefficient becomes larger as the cooling water temperature becomes higher and as the pressure within the fuel cell stack 1 becomes lower, as shown in FIG. 6. In this regard, in a case where both water temperature at a cooling water inlet side of the fuel cell stack and water temperature at a cooling water outlet side are detected as the cooling water temperature, it is desirable to calculate the correction coefficient using the higher one of the cooling water temperatures.

According to the present embodiment explained above, the stack requiring supply flow rate calculating unit 58 is configured so as to increase the target flow rate of the cathode gas (the stack requiring supply flow rate) as the temperature within the fuel cell stack 1 becomes higher. This makes it possible to obtain the similar effects to those of the first embodiment, and it is possible to compensate the stack requiring supply flow rate in accordance with the steam partial pressure within the fuel cell stack 1. For that reason, it is possible to further suppress the oxygen partial pressure within the fuel cell stack 1 from falling below the predetermined oxygen partial pressure surely.

As described above, although the embodiments of the present invention have been explained, the above embodiments merely illustrate a part of examples of application of the present invention, and it does not mean that a technical scope of the present invention is limited to a specific configuration of each of the embodiments described above.

The present application claims priority based on Japanese Patent Application No. 2013-59819, filed with the Japan Patent Office on Mar. 22, 2013, the entire content of which is expressly incorporated herein by reference.

The invention claimed is:

1. A fuel cell system configured to generate electric power by supplying an anode gas and a cathode gas to a fuel cell, the fuel cell system comprising:
   a compressor configured to adjust a flow rate of the cathode gas to be supplied to the fuel cell;
   a pressure regulating valve configured to adjust a pressure of the cathode gas to be supplied to the fuel cell;
   a water recovery device communicated with a supply of the cathode gas, and
   a controller programmed to
      calculate a target pressure of the cathode gas to be supplied to the fuel cell while taking into consideration a load of the fuel cell and a heat protecting requirement for the fuel cell system;
      calculate a target flow rate of the cathode gas to be supplied to the fuel cell in accordance with the load of the fuel cell and the target pressure of the cathode gas;
      control the compressor and the pressure regulating valve in accordance with the target pressure and the target flow rate of the cathode gas, and
      lower, when the target pressure of the cathode gas into the fuel cell is decreased in response to the heat protecting requirement for the fuel cell system, an inlet pressure of the cathode gas at an inlet side of the water recovery device in accordance with the target pressure, and also increase the target flow rate of the cathode gas into the fuel cell as the inlet pressure becomes lower.

2. The fuel cell system according to claim 1, wherein the controller is further programmed to increase the target flow rate of the cathode gas as a temperature within the fuel cell becomes higher.

3. The fuel cell system according to claim 1, wherein the controller is further programmed to:
   calculate a pressure of the cathode gas as a fuel cell requiring pressure on the basis of the load of the fuel cell, the pressure of the cathode gas being required to keep an oxygen partial pressure within the fuel cell to a predetermined pressure or higher; and
   set an upper limit value of the target pressure of the cathode gas on the basis of the heat protecting requirement for the fuel cell system, and
   calculate the smaller one of the fuel cell requiring pressure and the upper limit value as the target pressure of the cathode gas.

4. The fuel cell system according to claim 3, wherein the controller is further programmed to set the upper limit value so that an outlet temperature of the compressor does not become a predetermined temperature for protecting the compressor or higher.

5. The fuel cell system according to claim 3, wherein the controller is further programmed to set the upper limit value so that a temperature between the compressor and the fuel cell does not become a predetermined temperature for protecting components downstream from the compressor.

6. The fuel cell system according to claim 1, wherein the fuel cell system carries out a method comprising:

a target pressure calculating step configured to calculate the target pressure of the cathode gas to be supplied to the fuel cell while taking into consideration the load of the fuel cell and the heat protecting requirement for the fuel cell system;

a target flow rate calculating step configured to calculate the target flow rate of the cathode gas to be supplied to the fuel cell in accordance with the load of the fuel cell and the target pressure of the cathode gas, and to increase the target flow rate of the cathode gas as the target pressure of the cathode gas becomes lower; and a control step configured to control the compressor and the pressure regulating valve in accordance with the target pressure and the target flow rate of the cathode gas.

7. The fuel cell system according to claim 1, wherein the fuel cell system carries out a method of controlling the fuel cell system to generate electric power by supplying the anode gas and the cathode gas to the fuel cell, the method comprising:

adjusting, by the compressor, the flow rate of the cathode gas to be supplied to the fuel cell;

adjusting, by the pressure regulating valve, the pressure of the cathode gas to be supplied to the fuel cell;

calculating the target pressure of the cathode gas to be supplied to the fuel cell while taking into consideration the load of the fuel cell and the heat protecting requirement;

calculating the target flow rate of the cathode gas to be supplied to the fuel cell in accordance with the load of the fuel cell and the target pressure of the cathode gas;

controlling, by the controller, the compressor and the pressure regulating valve in accordance with the target pressure and the target flow rate of the cathode gas; and increasing the target flow rate of the cathode gas as the target pressure of the cathode gas becomes lower.

8. A fuel cell system configured to generate electric power by supplying an anode gas and a cathode gas to a fuel cell, the fuel cell system comprising:

a compressor configured to adjust a flow rate of the cathode gas to be supplied to the fuel cell;

a pressure regulating valve configured to adjust a pressure of the cathode gas to be supplied to the fuel cell; and a controller programmed to
calculate a target pressure of the cathode gas to be supplied to the fuel cell while taking into consideration a load of the fuel cell and a heat protecting requirement for the fuel cell system;

calculate a target flow rate of the cathode gas to be supplied to the fuel cell in accordance with the load of the fuel cell and the target pressure of the cathode gas;

control the compressor and the pressure regulating valve in accordance with the target pressure and the target flow rate of the cathode gas, and increase, when the target pressure of the cathode gas into the fuel cell is decreased in response to the heat protecting requirement for the fuel cell system, the target flow rate of the cathode gas into the fuel cell such that oxygen partial pressure within the fuel cell remains higher than a predetermined oxygen partial pressure.

9. The fuel cell system according to claim 1, wherein an amount by which the target flow rate of the cathode gas is increased corresponds to an amount by which the inlet pressure of the water recovery device is decreased when the inlet pressure is controlled to reach a limit pressure.

10. The fuel cell system according to claim 8, wherein as a current of the fuel cell becomes higher, the target flow rate of the cathode gas becomes higher so as to maintain the oxygen partial pressure above the predetermined oxygen partial pressure.

* * * * *